Jan. 2, 1962 D. B. GARDINER ET AL 3,015,343
POWER TRANSMISSION
Filed Nov. 24, 1958 3 Sheets-Sheet 1

INVENTORS
DUNCAN B. GARDINER
FRANK E. HILL
BY Van Meter and George
ATTORNEYS

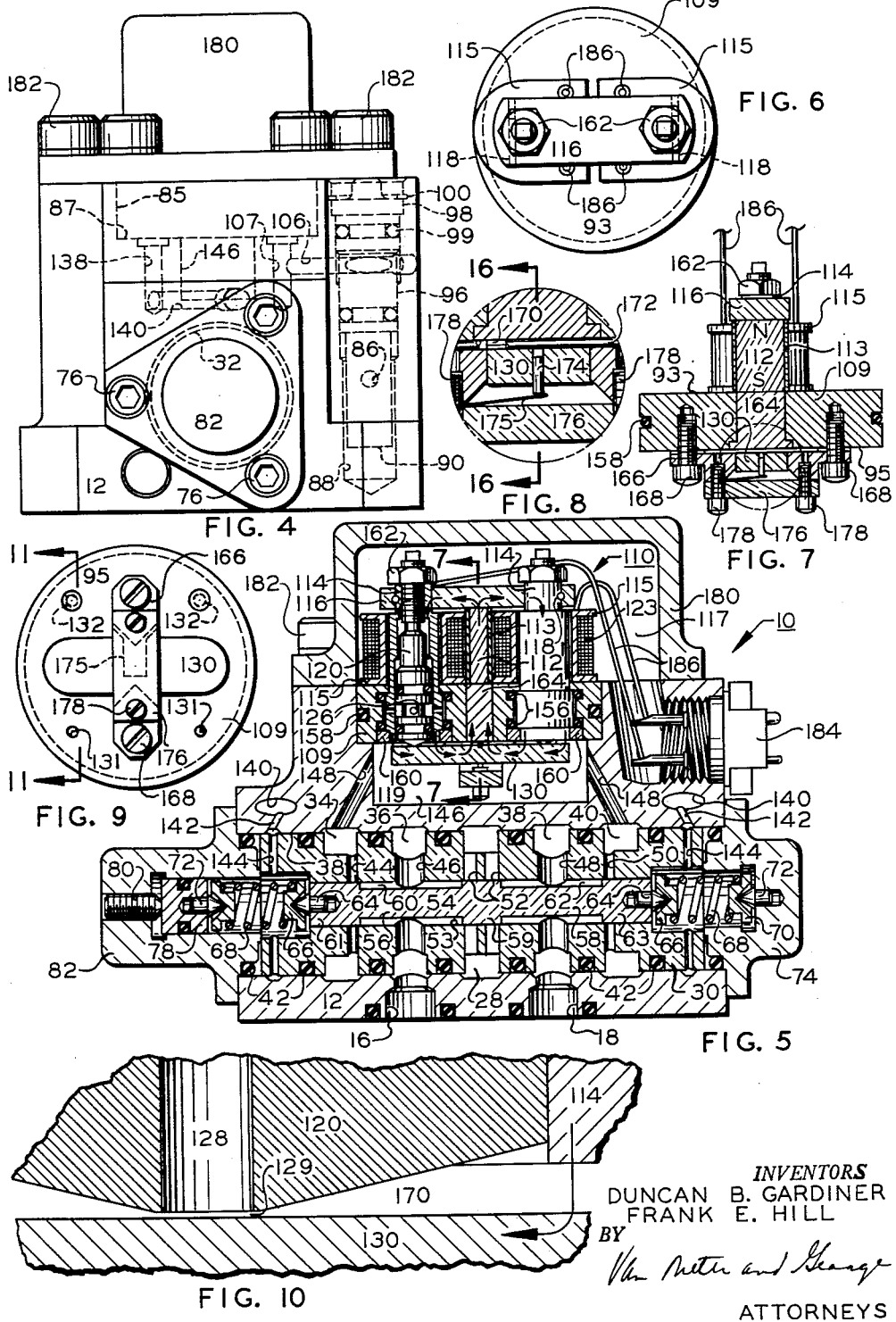

Jan. 2, 1962 D. B. GARDINER ET AL 3,015,343
POWER TRANSMISSION
Filed Nov. 24, 1958 3 Sheets-Sheet 3
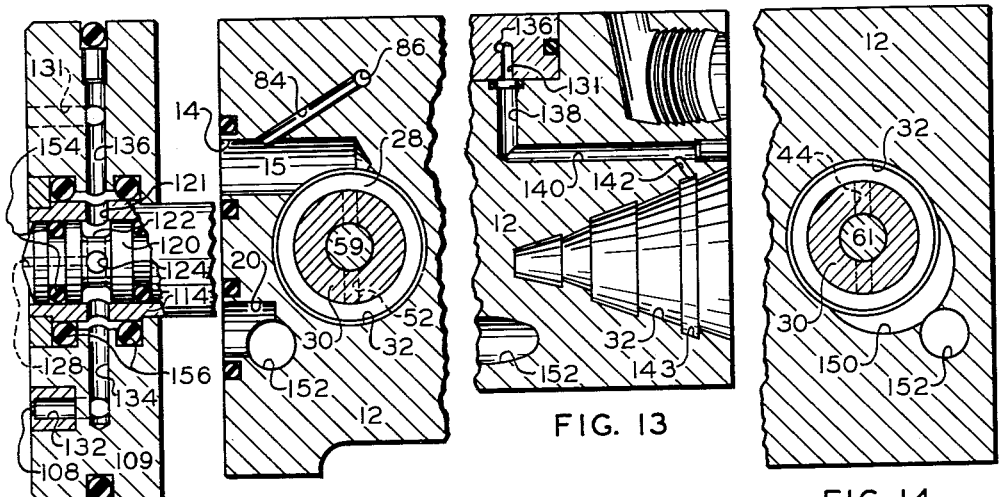
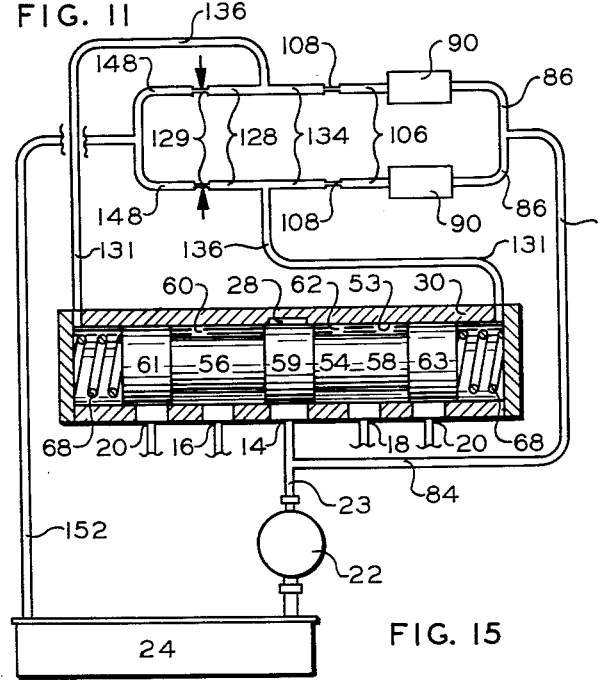
*INVENTORS*
DUNCAN B. GARDINER
FRANK E. HILL
BY
ATTORNEYS

United States Patent Office 3,015,343
Patented Jan. 2, 1962

3,015,343
POWER TRANSMISSION
Duncan B. Gardiner and Frank E. Hill, Detroit, Mich., assignors to Vickers Incorporated, Detroit, Mich., a corporation of Michigan
Filed Nov. 24, 1958, Ser. No. 775,957
13 Claims. (Cl. 137—623)

This invention relates to power transmissions, and is particularly applicable to those of the type comprising two or more fluid pressure energy translating devices, one of which may function as a pump and another as a fluid motor.

More particularly, this invention relates to a servo control system and specifically to an electrically controlled, hydraulically operated, two-stage servo valve wherein the differential control pressure developed in the first stage is proporational to the signal current and results in the output flow of the valve of the second stage, being directly proportional to the electrical input signal.

This valve is particularly useful in electro hydraulic circuits where the requirements call for maximum reliability and performance such as in missiles and aircraft control systems, radar scanner actuation, contour following machine tools and automatic packaging equipment, or other types of similar applications. The servo valve can be conveniently manifolded to a device such as a linear or rotary type actuator, thereby providing a very compact package for application where low control power, weight and size factors are critical.

This invention provides a two-stage servo valve which is stable in its operation over a wide range of fluid pressures and flow rates. The first stage comprising the torque motor, flapper or armature and nozzles permits a degree of flexibility in that the subassembly is readily separable from the second stage subassembly and can, therefore, be used with various types of second stage components, such as flow control or pressure control valves and relatively small actuators.

The prior art teaches the use of dry coil torque motors in servo systems. However, the means of transmitting the magnetic lines of force between the magnets, including the electromagnets, and the armature is usually through a movable diaphragm, which introduces mechanical hysteresis into the motor. Constant mechanical reversing of the diaphragm requires a seal strong enough to withstand proof pressures and thereby prevent leakage into the torque motor coils.

The present invention overcomes this critical sealing problem by eliminating the diaphragm and utilizing an arrangement wherein the magnetic lines of force pass through a sealed barrier without the employment of any mechanical action, thereby minimizing the hysteresis in the motor. Contamination of the torque motor is prevented in this manner by permanently sealing the torque motor coils from the hydraulic fluid by means of the sealed barrier through which the magnetic circuit passes. In order to provide for a more satisfactory and efficient magnetic circuit, the jet nozzles which are associated with the armature or flapper to form a pair of variable orifices are directly incorporated in the two pole pieces of the torque motor, thereby permitting the hydraulic jet flow across the orifices to vigorously clean the working gaps of the magnetic circuits with the pressurized filtered fluid. This novel arrangement provides for a more efficient magnetic circuit under operating conditions, as well as provides for maximum stability and sensitivity at high pressures and high flow rates.

It is an object of this invention to provide a new and improved electro hydraulic servo valve having flow control means incorporated therein.

It is a further object of this invention to provide an improved package for an electro hydraulic servo valve of the type utilizing a dry coil torque motor or solenoid, wherein the coils are isolated from the hydraulic fluid.

Another object of the invention is to provide an electro hydraulic servo valve wherein the output flow of the valve is directly proportional to the differential electrical input signal for constant load pressures.

Another object of the invention is to provide a sealed barrier through which the flux of the magnetic circuit of the solenoid will pass but which will not pass mechanical motion.

Still another object is to provide self-cleansing means for the magnetic working gaps of the torque motor.

A further object is to place the nozzles directly in the pole pieces of the torque motor and inject the jet flow of hydraulic fluid therein, thereby keeping the magnetic working gaps forcefully flushed with filtered fluid.

A still further object is to provide a servo valve wherein the first stage, including the torque motor, flapper and nozzles, is easily and readily detachable from the second stage.

A still further object is to provide an electro hydraulic servo valve whose requirements emphasize weight, size and maximum reliability and performance.

Another object of the invention is to provide a low-cost, economical, simple and durable electro hydraulic servo valve.

Further objects and advantages of the present invention will be apparent in the following description, reference being had to the accompanying drawings wherein a preferred form of the present invention is clearly shown.

In the drawings:

FIGURE 4 is the left side view of the servo valve.

FIGURE 5 is the longitudinal sectional view taken through line 5—5 of FIGURE 1.

FIGURE 6 is the top view of the torque motor.

FIGURE 7 is a sectional view taken through line 7—7 of FIGURE 5 showing one way of mounting the armature of the torque motor in order to practice the invention.

FIGURE 8 is an enlarged view of a part of FIGURE 7 showing a way of pivoting the armature.

FIGURE 9 is a bottom view of the torque motor.

FIGURE 10 is an enlarged view of part of FIGURE 5 showing the variable jet orifice of the torque motor.

FIGURE 11 is an enlarged sectional view taken along line 11—11 of FIGURE 9.

FIGURE 12 is a sectional view taken along line 12—12 of FIGURE 3.

FIGURE 13 is a sectional view taken along line 13—13 of FIGURE 1.

FIGURE 14 is a sectional view taken along line 14—14 of FIGURE 3.

FIGURE 15 is a schematic view of the servo valve embodying the preferred form of the invention.

FIGURE 16 is an enlarged sectional view taken along line 16—16 of FIGURE 8.

Figure 3:
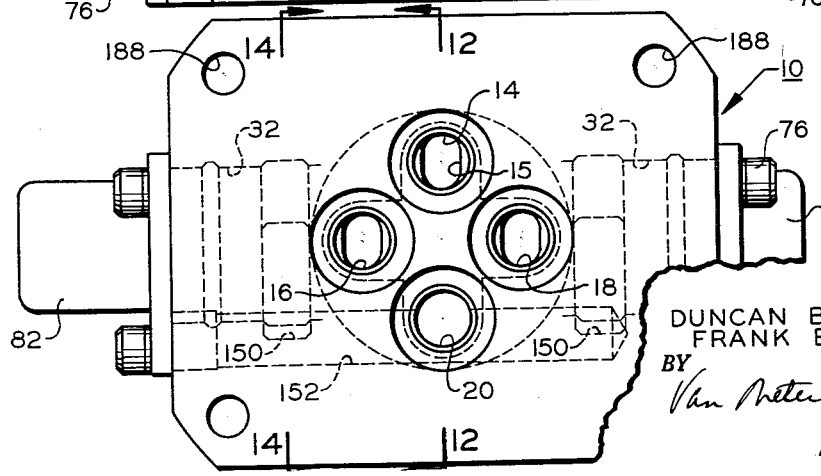
FIGURE 3 is the bottom view of the servo valve.

Referring to the accompanying drawings which illustrate a preferred embodiment of the invention, there is shown an electrically controlled, hydraulically operated, two-stage flow control servo valve generally designated 10. FIGURE 5 shows a longitudinal sectional view of the valve 10, which includes a valve body 12, which may be made from steel, or aluminum bar stock or other lightweight material. FIGURE 3 shows a view of the bottom face of the servo valve 10 consisting of a pressure supply port 14, a pair of pressure control ports 16 and 18 and a fluid return port 20. Ports 16 and 18 are connected to a fluid motor not shown. The pressure supply port 14 communicates with a pump 22 through a conduit 23, as is shown in FIGURE 15, which is a partial schematic drawing of the hydraulic servo valve 10. The pump 22 is connected to a reservoir 24 and delivers a supply of fluid to the pressure port 14 at the desired pressure from where the majority of the fluid passes through passage 15 into an annular chamber 28 maintained by an annular groove on the outer periphery of the valve sleeve 30 and the annular recess in the wall of a cylindrical bore 32.

The substantially cylindrical valve sleeve 30 is preferably made of steel or an alloy thereof and has an outer diameter of such a size that it provides a tight fit within the valve bore 32. The valve sleeve 30 is provided with a plurality of annular grooves on the outer periphery, which grooves cooperate with corresponding annular recesses in the wall of the bore 32 to describe a series of annular passages 34, 36, 38 and 40. Passages 36 and 38 communicate with the pressure ports 16 and 18 respectively, which control the fluid flow to the hydraulic circuit, while the remaining annular passages 34 and 40 are in communication with the drain port 20, which transmits the return fluid to the reservoir 24. O-rings 42 are placed in between each of the annular passages 34, 36, 38 and 40, and the adjacent, opposite ends of the valve body 12. The O-rings 42 provide fluid sealing engagement means between the valve sleeve 30 and the bore 32 of the valve body 12.

The valve sleeve 30 has a plurality of radial fluid passages 44, 46, 48 and 50, which cooperate with the annular passages 34, 36, 38 and 40 respectively, so as to provide fluid communication between the outer annular chambers formed on the outer periphery of the valve sleeve 30 and the bore 32 of the valve body 12 and the inner bore 53 of the valve sleeve 30. A pair of passages 52 are also provided in the valve sleeve 30, thereby intermittently placing the annular chamber 28 in union with the inner bore 53 of the valve sleeve 30.

A valve spool 54 is slidably mounted within the valve sleeve 30 for longitudinal movement therein. The spool 54 has two step-down portions 56 and 58, properly spaced on opposite sides of the center land 59 and in between the outer lands 61 and 63, thereby providing annular fluid chambers 60 and 62 respectively, which are in communication with the pair of control ports 16 and 18.

A pivot pin 64 is slidably mounted on each end of the valve spool 54. The pivot pin 64 is provided with an outer pivot end, conically shaped, so as to provide a control surface for positioning retainer 66, which is carried by a coil compression spring 68. On the other end of the coil compression spring 68 is a bearing retainer 70, which is urged against the pivot pin 72. One of the pivot pins 72 is slidably mounted in the end cap 74, which is secured to the valve body 12 by means of set screws 76. The remaining pivot pin 72 is adjustably mounted in a cylindrical member 78, which is positioned by means of an adjustment screw 80 mounted in the end cap 82. Set screws 76 secure the end cap 82 to the valve body 12.

The coil springs 68 are utilized so as to provide a steady loading on opposite sides of the valve spool 54. The adjustment screw 80 provides accurate adjustment means for centering the spool 54 within the valve sleeve 30. At the null position there is no impressed signal or any appreciable flow. The springs can be varied to provide the proper pre-loading and centering.

The valve spool 54 is driven by a signal induced change in differential pressure between a pair of nozzles 120, which differential pressure is exerted on opposite ends of the valve spool 54 to control the output flow. Therefore, the output flow is directly proportional to the electrical input signal for normally constant load pressures.

Figure 2:
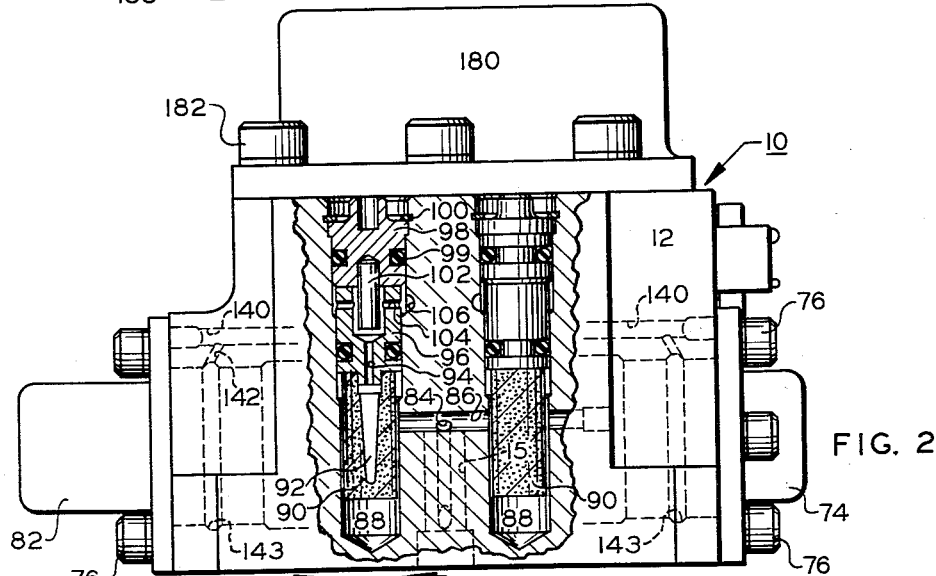
FIGURE 2 is a partial sectional front view of the servo valve.

Sectional view, FIGURE 12, shows the pressure supply port 14 communicating through inlet passage 15 directly with the middle outer chamber 28 of the valve body 12. A portion of the inlet supply fluid is diverted by means of a passage 84, which extends from passage 15 to a transverse passage 86. The transverse passage 86 extends in opposite directions from passage 84, as is shown in FIGURES 2 and 15, thereby providing a parallel circuit with each branch of passage 86 extending into a cavity 88, which houses a filter assembly 90. Each filter assembly 90 comprises a hollow metallic filter 92 and a magnetic trap 102 through which the pressure fluid passes and which is designed to filter and remove any particles entrained therein above a predetermined size before the fluid enters the orifice and nozzle assembly. The pressure fluid passes into the hollow interior of the metal filter 92 and thence through a restricted passage 94 located in a sealing plug 96 fitted within cavity 88. The plug 96 has an O-ring sealing gasket around it. Filter 90 is secured to the inner end of the sealing plug 96, while the opposite end of the plug member 96 is secured to the end plug sealing member 98. Sealing plug 98 is provided on its outer periphery with an O-ring gasket 99 and is locked within cavity 88 by means of a locking device 100.

Figure 1:
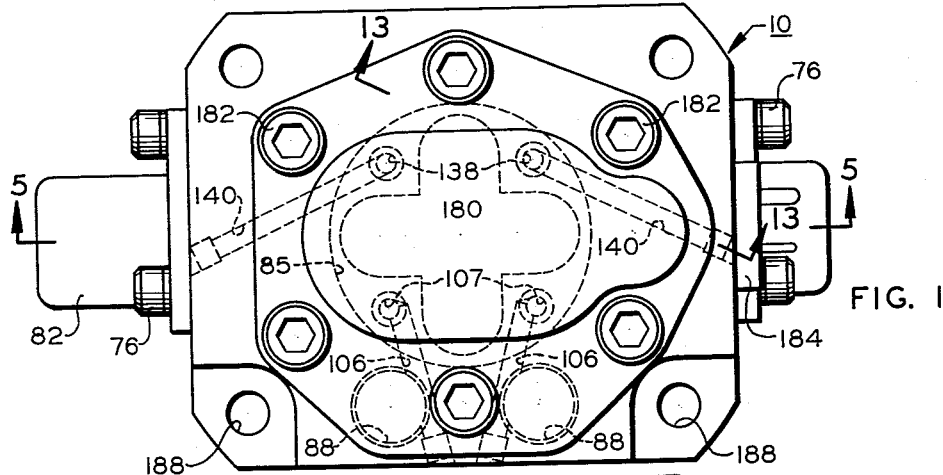
FIGURE 1 is the top view of the servo valve embodying the present invention.

The sealing plug 98 carries a magnetic trap 102 which removes metallic particles entrained in the fluid. The fluid passes by the magnetic trap 102 through a radial passage 104 in the plug member 96 from where it passes longitudinally into passage 106, as is shown in FIGURES 1, 2 and 4. After the fluid has entered passage 106, it passes through to a vertical passage 107 from where it passes through the fixed orifice 108 located in the nonmagnetic barrier 109, as is shown in FIGURE 11. The barrier 109 is placed in the annular cavity 85, formed in the body 12, against the internal flat mounting surface 87 of the body 12.

The nonmagnetic barrier 109 divides the internal cavity formed by the body 12 and cover 180 into two zones: a dry zone 117, located in the cover 180, and a wet zone 119, formed in the valve body 12. The barrier 109 has a pair of faces 93 and 95 and is a component part of the torque motor assembly 110. A pair of hollow magnetic pole pieces 114 are inserted in the barrier 109 and form an integral part of the barrier. The magnetic pole pieces 114 originate in the dry zone 117 and terminate in the wet zone 119.

The torque motor assembly 110 is of the dry coil type wherein the coils 115 are placed on the hollow pole pieces 114 in the dry zone 117 to form a pair of electromagnets 123 which are connected in parallel. The coils 115 are completely sealed off from the hydraulic fluid and are not subject to harmful fluid effects. A permanent magnet 112, having copper wrappings 113 therearound, is also located in the dry zone 117. The pole pieces 114 are held in spaced relationship by a yoke 116 which is pinned to the pole pieces 114 by means of a yoke pin 118. By placing the torque motor coils 115 on separate bobbins, the disadvantage of unequal resistances resulting from concentric windings on a common spool is avoided. Equal load resistances are especially important when a wide operating temperature range is required, since any initial difference in winding resistances would be magnified by large temperature changes. By maintaining equal resistances throughout the temperature range, the null shift is minimized.

Inside each of the pole pieces 114 is located an adjustable jet nozzle 120. The nozzle 120 is composed of a nonmagnetic material such as beryllium copper and consists of a plurality of lands and grooves. The middle groove 122 is provided with a pair of perpendicularly drilled holes 124 and 126 extending therethrough. A longitudinal hole 128 communicates with the radially drilled holes 124 and 126 and extends therefrom to the tapered bottom of the variable jet nozzle 120. The adjustable nozzle 120 remains fixed within the pole piece 114 after the gain adjustment has been made.

After the fluid has passed the fixed orifice 108, a division of the flow takes place. Part of the fluid passes through passages 132 and 134 and finally through passage 121 in the pole piece 114 into the jet nozzle 120. The rest of the fluid continues through a passage 136 from where it finally enters passage 131 and on to the corresponding end of the valve spool 54 by means of passages 138, 140, 142 and 143, as is shown in FIGURES 4, 5 and 13. The pressurized fluid is directed to the outer ends of the valve spool 54 (which is responsive thereto) by means of a drilled passage 144 formed in the valve sleeve 30. Fluid discharging from the pair of variable orifices 129 into the cavity 146 passes through the adjacent passage 148, from where the fluid enters chambers 34 and 40 respectively, which communicate with the enlarged sections 150. These sections 150 are symmetrically connected to the drain port 20 by means of a longitudinal, horizontal passage 152.

A pair of O-rings 154 are placed in the outer grooves of the nozzle 120, thereby preventing leakage across the pole piece 114. A pair of O-rings 156 are utilized on the outer periphery of the pole piece 114, thereby preventing leakage between the coil and barrier boundary. An O-ring 158 is placed on the outer periphery of the nonmagnetic barrier 109 to maintain and seal the dry zone 117.

Rings 160 are inserted in the barrier 109 to position the pole pieces 114. The upper end of the nozzle 120 is threadably secured to the pole piece 114 and forms therewith an integral unit. A nut 162 serves as a locking device and provides the nozzle adjustment. The nozzles 120 are positioned after assembly by means of fine machine threads, thereby allowing a very accurate adjustment of valve gain. The armature or flapper 130 is pivotally connected near its center in the wet zone 119 to a magnetic pole insert 164 located in the nonmagnetic barrier 109. The armature 130 is the only moving part in the magnetic circuit comprising the permanent magnet 112, yoke 116, electromagnets 123, insert 164 and armature 130.

An armature holder 166 positions the movable armature 130 with reference to the nozzles 120. Cap screws 168 secure the holder 166 to the barrier 109. The spacer or fulcrum 172 is positioned in the working gap 170, located between the barrier 109 and armature 130 in the wet zone 119, to maintain the working gap 170 at a proper and predetermined size. The armature 130 has a pin 174 pressed therein and is held in its pivotal position by a spring 175, which is urged against the pin 174 by a flat plate member 176. Member 176 is secured to the armature holder 166 by cap screws 178. It should be understood that other fastening arrangements can be utilized to position the armature 130, with reference to the nozzles 120, in order to form a pair of variable orifices 129.

After the torque motor assembly 110, nozzles 120 and armature 130, which jointly form the first stage, are placed in the valve body 12, a cover 180 is placed on the body 12 and is secured thereto by removable cap screws 182. An electrical connector 184 is secured to the outside of the valve body 12, and lead wires 186 are soldered on one end to the connector 184 and to the torque motor coils 115 on the other end. A plurality of mounting holes 188 are located in the bottom face of the valve body 12.

When no signal is impressed on the torque motor 110, only control oil and balanced leakage oil flows through the servo valve 10. When the valve 10 is in its null position, that is, when there is no impressed signal on the torque motor 110, there is nevertheless a magnetic field present in the torque motor 110 containing magnetic lines of force or lines of magnetic flux due to the influence of the permanent magnet 112 on the surrounding space, as is represented by the arrows in FIGURE 5 and FIGURE 10.

The lines of force about the permanent magnet 112 leave the north pole of the magnet 112 and travel in both directions in loops through the yoke 116, pole pieces 114, armature 130, magnetic insert 164 and finally through the magnet 112 to the north pole. The armature 130 completes two magnetic flow paths for the permanent magnet 112. When the valve 10 is at a null position, the magnetic moments on the armature 130 are theoretically balanced such that the armature 130 pivots at its center and maintains a constant pressure drop across each of the variable orifices 129. The pair of electromagnets 123 are connected in parallel so as to cooperate to produce a pair of opposing magnetic fields and form magnetic paths similar to those represented in FIGURES 5 and 10. The torque motor 110, as contemplated within the meaning of this invention, is a differential electromagnetic apparatus which produces additive electromagnetic effects when the currents of different magnitudes in the separate coils flow in a common direction.

The restraint due to the spacer or fulcrum 172, which pivots the armature 130, is negligible and does not effectively enter into the calculations. When the differential current energizes the coils 115, the magnetic lines of force produced thereby will combine to rotate the armature 130 through a small angular displacement, thereby increasing the size of one orifice 129 and decreasing the other. This displacement causes a corresponding change in the hydraulic forces acting through the orifices 129 on the armature 130, which produces a torque on the armature 130 opposing the magnetically impressed torque.

Although we have provided a filtering arrangement in the valve, small particles will pass through the filters 90 into the nozzles 120 and working gaps 170. In prior art valves, these small particles will gradually accumulate by the gradual deposit of the particles in the working gaps. These particles prevent the lines of force from being concentrated in the magnetic material, as desired. It is well-known that the magnetic flux will travel more readily through magnetic material than through air or oil. The ability of a substance to concentrate these magnetic lines of force is called its permeability with iron, for example, being much more permeable than air or oil. If the working gaps are blocked by contamination, the permeability of the working gaps is changed and the linearity of the system is impaired. By utilizing the jet flow of the hydraulic fluid from the nozzles 120 for flushing the magnetic working gaps 170, the main flux is permitted to travel directly from the pole pieces 114, across the working gaps 170 and through the flapper or armature 130. The concentration of the lines of force through the armature 130 indicates the strength of the magnetic field, which can be easily controlled by regulating the currents in the coils 115.

As previously mentioned, the torque motor coils 115 are completely sealed from the hydraulic fluid. This is accomplished by means of a nonmagnetic sealing barrier 109, which has the torque motor pole pieces 114 inserted therein and through which the magnetic circuit passes. The barrier 109 does not permit the transmission of mechanical motion. This unique feature thereby avoids the hazard of transmitting mechanical motion through a seal or diaphragm strong enough to withstand large pressures and further avoids the adverse effect of hysteresis of a moving barrier.

In operation filtered fluid at the supply pressure is applied to the first stage, consisting of two parallel branches, each branch having a fixed orifice 108 followed by a variable orifice 129. The drop across the fixed orifice 108 depends on the flow such that with a high flow, there is a high drop involved. With a lower flow, there is a lower drop across the orifice. The two variable orifices 129 are comprised of the pivoted flapper or armature 130 and the two nozzles 120. When a differential current is supplied to the torque motor coils 115, a torque is produced which results in a small angular displacement of the flapper 130. This displacement increases the restriction on one nozzle and decreases it on the other, thereby providing differential metering of the controlled flow.

The controlled pressures are tapered off between the fixed and variable orifices, as control flow on one side of the servo valve 10 is decreased by the flapper 130 moving closer to one of the nozzles 120, and thus reducing the associated variable orifice 129. The pressure drop across the fixed orifice 108, which is connected in series with the reduced variable orifice, decreases because of the reduced control flow. This results in a higher control pressure on one end of the spool 54 so as to shift it accordingly. The spool 54 assumes a new position and therefore increases the flow of supply fluid to one pressure port and decreases the flow to the other pressure port. A lowered pressure results on the other end of spool 54 as a result of the flapper 130 moving away from the other nozzle 120. The corresponding resultant control flow and the fixed orifice drop increase. The differential control pressure assumes a value which will just balance the torque on the flapper 130 due to the differential current. This is accomplished by the control pressures acting through the nozzles 120 against the flapper 130 to produce a net hydraulic force on the flapper 130, which is proportional to the difference in the control pressures.

In brief, when a differential signal current is applied to the torque motor 110, a corresponding torque is produced on the armature 130. In order to overcome the displacement caused by the torque, the differential control pressure developed in the jet nozzles 120 is proportional to the torque and, therefore, proportional to the signal input current. Since the control pressures act upon opposite ends of the main metering spool 54 in the second stage, the differential control pressure acts on the spool ends balanced by the restraining springs resulting in a position of the spool 54 being proportional to the differential current impressed on the torque motor 110.

The first stage of the servo valve 10 comprises the torque motor assembly 110, nozzles 120 and armature 130 which forms an integral and compact first stage device for developing a differential control pressure. The first stage is removable from the second stage, comprising the main metering spool 54, with ease and with a minimum amount of work. The only connection between the first and second stages is the hydraulic connection which is effected by the mere insertion of the first stage assembly in the cavity 85 against the face 87.

The first stage assembly is retained in the cavity 85 by an abutment, not shown, positioned between the cover 180 and the upper face 93 of the barrier 109. The abutment merely positions the first stage assembly in the cavity and does not connect the first and second stages. The external mechanical connections 182 secure the cover to the body and do not physically connect the stages.

It is apparent that the first stage assembly described herein permits a desirable degree of flexibility and may be utilized with various types of second stage components.

While the form of embodiment of the invention as herein disclosed constitutes a preferred form, it is to be understood that other forms might be adopted, all coming within the scope of the claims which follow.

What is claimed is as follows:

1. An electro-hydraulic servo valve comprising: a dry zone; a wet zone; an electromagnetic coil in the dry zone; permanent magnetic means in the dry zone; means forming a mechanically static barrier interposed between the dry and wet zones; means in the wet zone spaced from said barrier forming between said last named means and barrier a working gap; and fluid impervious magnetic material forming part of and extending through said barrier to conduct flux from said coil and said permanent magnet to said working gap.

2. In an electro-hydraulic servo valve: a dry zone; a wet zone; an electromagnetic coil in the dry zone; permanent magnetic means in the dry zone; means forming a mechanically static barrier interposed between the dry and wet zones; an armature in the wet zone spaced from said barrier and forming a working gap between said barrier and said armature; and fluid impervious magnetic material forming part of and extending through said barrier to conduct flux from said coil and said permanent magnet to said armature by way of said working gap.

3. In an electro-hydraulic servo valve for developing a differential hydraulic pressure: a dry zone; a wet zone; a mechanically static barrier separating said dry zone from said wet zone; a pair of magnetic pole pieces originating in said dry zone, extending through said barrier and terminating in said wet zone; coils on said pole pieces in said dry zone; permanent magnet means in said dry zone; a magnetic material insert positioned in said barrier in flux-conducting relationship with said permanent magnet means; and an armature pivotally mounted on said insert in said wet zone between said pole pieces so as to form working gaps with said pole pieces and provide flux conducting paths for the flux traveling across said air gaps and into said insert.

4. A torque motor for utilization in a hydraulic circuit, in combination: a pole piece; an armature; a non-magnetic nozzle mounted in said pole piece directed at said armature and defining with said armature an orifice; and a magnetic working gap between said pole piece and armature, whereby the flow across the orifice cleans the working gap.

5. In an electro-hydraulic servo valve: a dry zone; a wet zone; a relatively nonflexible sealing barrier separating said zones; a pole piece communicating with each of said zones and extending through said sealing barrier; an armature in said wet zone defining a magnetic working gap with said pole piece; and a non-magnetic nozzle in said pole piece cooperating with said armature to define an orifice which is connected in series hydraulically with said working gap, whereby the flow across said orifice passes through and cleans said working gap.

6. In an electrically controlled device for developing a differential hydraulic pressure: a dry zone; a wet zone; a substantially nonflexible sealing means separating said dry zone from said wet zone; a pair of pole pieces extending through said sealing means into communication with said wet and dry zones; an armature in said wet zone magnetically coupled to said pole pieces; magnetic working gaps formed between said pole pieces and said armature; and a non-magnetic nozzle in each of said pole pieces defining with said armature a pair of orifices each of which are connected in series hydraulically with one of said working gaps in said wet zone.

7. An electrically controlled device for developing a differential hydraulic pressure, in combination: a dry zone; a wet zone; a substantially nonflexible sealing means separating said dry zone from said wet zone; a pair of pole pieces extending through said sealing means into communication with said wet and dry zones; an armature pivotally mounted in said wet zone and magnetically coupled to said pole pieces; magnetic working gaps formed between said pole pieces and said armature; and an adjustable non-magnetic nozzle in each of said pole pieces defining with said armature a pair of variable orifices each of which is connected in series hydraulically with one of said working gaps in said wet zone.

8. In an electrically controlled device for developing a hydraulic pressure: a dry zone; a wet zone; means forming a mechanically static barrier interposed between the dry and wet zones; an armature in said wet zone; a magnetic pole piece positioned in said barrier and communicating with said wet and dry zones; and a nozzle axially adjustable in said pole piece and defining with the armature a variable orifice across which the hydraulic pressure is developed.

9. A differential electromagnetic device for developing a differential hydraulic pressure, in combination: differential electromagnetic means including a pair of pole pieces and an armature pivotally supported at its center between said pole pieces; and a non-magnetic nozzle located in each of said pole pieces to define with said armature a pair of orifices, whereby the differential pressure developed across said orifices is proportional and opposite to the differential magnetic forces impressed on said armature.

10. An electrically controlled device for developing a differential hydraulic pressure, in combination: a pair of pole pieces; a third pole piece including a permanent magnet positioned between said pair of pole pieces; an armature pivotally supported at its center on said third pole piece having a balanced and unbalanced position; a nozzle located in each of said pair of pole pieces and cooperating with the balanced armature to define a pair of orifices of substantially the same size; and differential electrical means for impressing a torque on said balanced armature so as to vary the size of said orifices and produce a pressure differential across said orifices which results in a torque being applied to the unbalanced armature tending to restore the armature to its balanced position.

11. An electro-hydraulic servo valve comprising: a valve body; a cover mounted on said body; a dry zone in said cover; a wet zone in said body; a removable first stage assembly for developing a differential pressure positioned partially in said dry zone, said first stage assembly comprising a torque motor having all electrical components located in the dry zone and an armature and nozzles in the wet zone; a second stage assembly responsive to the differential pressure developed in the first stage, including said body and an actuator movable in said body; and a fluid barrier member positioned in said body, having said electrical components mounted on one side thereof and said armature mounted on the other side thereof, said barrier forming a part of said removable first stage assembly.

12. A differential electrical hydraulic device for developing a differential hydraulic pressure comprising: a body; a cover mounted on said body; a mechanically static barrier dividing the inside of said body and cover into a dry zone and a wet zone; a pair of pole pieces originating in said dry zone and extending through said barrier into communication with the wet zone; coils in the dry zone surrounding said pole pieces; an armature in the wet zone pivotally supported by the barrier between said pole pieces; and a nozzle positioned in each pole piece to define with said armature a pair of orifices, said nozzles, barrier, pole pieces, coils, and armature forming a unitary assembly which is removable from said body by initially removing the cover and separating the unitary assembly from said wet zone.

13. In an electro-hydraulic servo valve: a body; a cover mounted on said body; a dry zone in said cover; a wet zone in said body; a spool valve movable in said body; a relatively flat mounting surface in said body; a mechanically static barrier interposed in said body in fluid sealing engagement with said mounting surface between said wet and dry zones; differential electrical means in said dry zone; variable orifices in said wet zone across which is developed a differential hydraulic pressure proportional to the differential current impressed on said differential electrical means; first passage means in said barrier leading from said orifices to said mounting surface; and second passage means in said body leading from said mounting surface to opposite ends of said spool valve, said first and second passage means delivering the differential hydraulic pressure developed across said orifices to opposite ends of the valve spool.

References Cited in the file of this patent

UNITED STATES PATENTS

| | | |
|---|---|---|
| 1,284,021 | Wright | Nov. 5, 1918 |
| 2,372,853 | Ray | Apr. 3, 1945 |
| 2,449,438 | Wisegarver | Sept. 14, 1948 |
| 2,476,519 | Van Der Werff | July 19, 1949 |
| 2,853,090 | Hanna et al. | Sept. 23, 1958 |
| 2,933,269 | Hanna et al. | Apr. 19, 1960 |